April 15, 1958        S. WALLIN        2,830,573
METHOD AND DEVICE FOR SAWING OF STONE BLOCKS
Filed Nov. 21, 1955        3 Sheets-Sheet 1
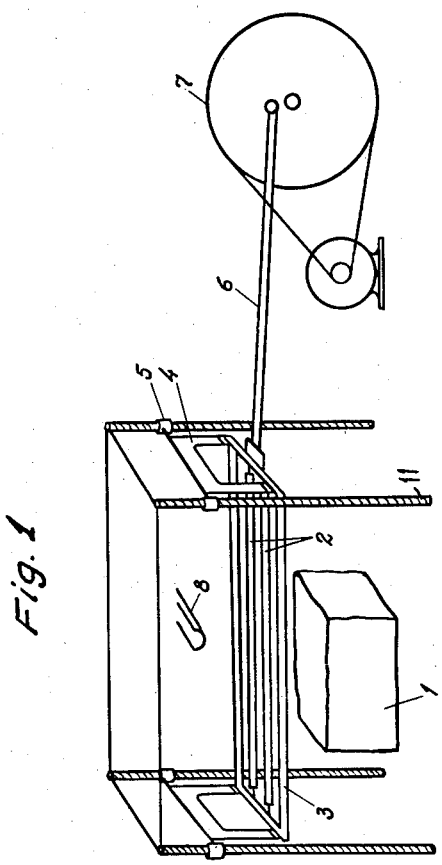

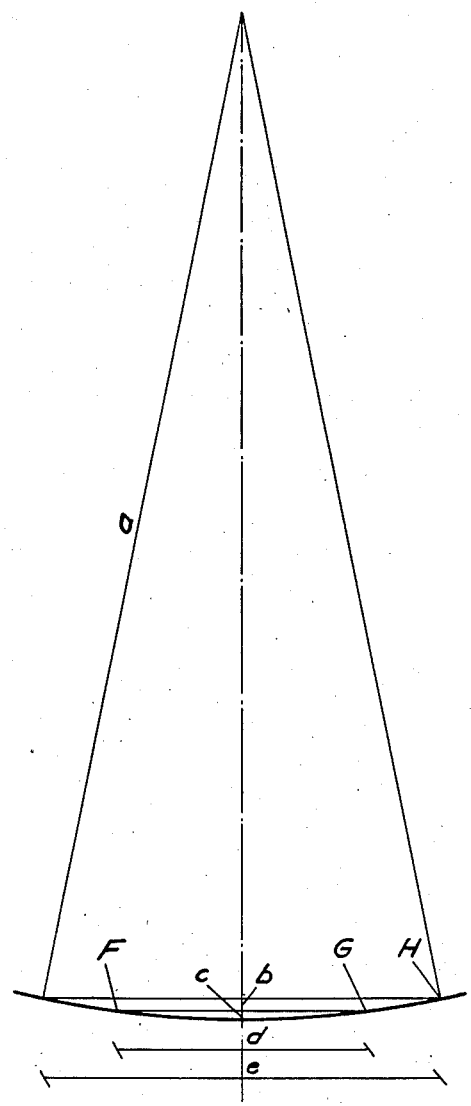

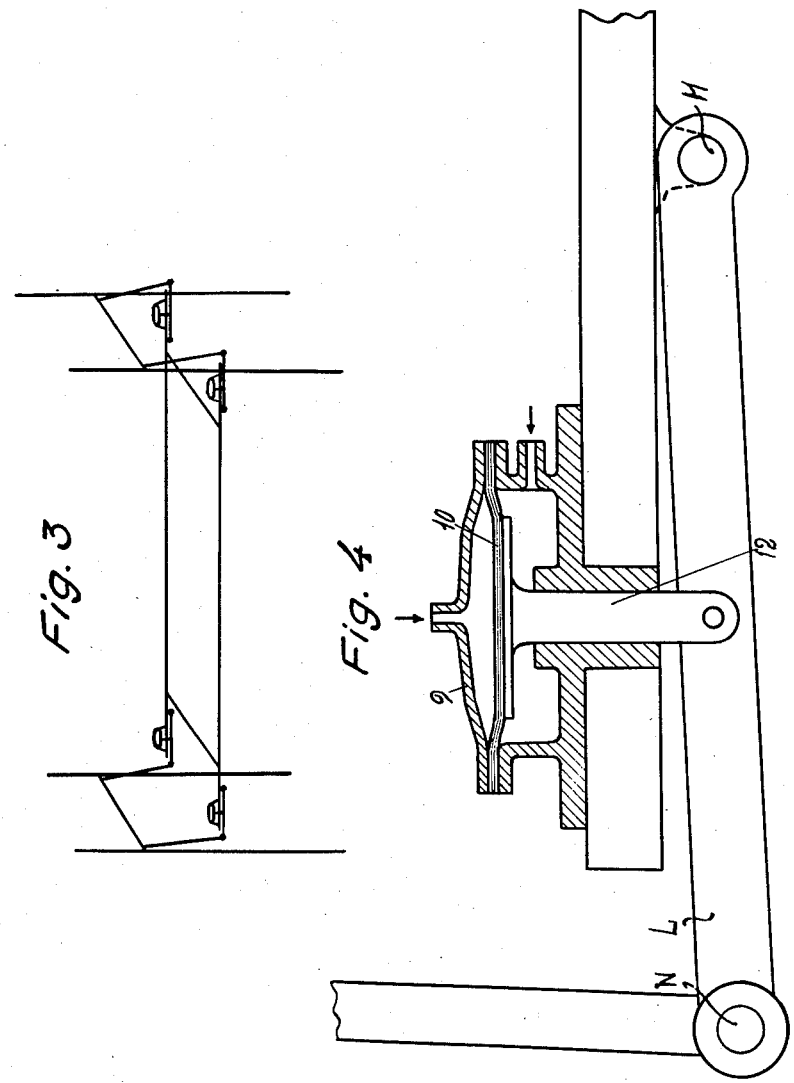

United States Patent Office 2,830,573
Patented Apr. 15, 1958

2,830,573

METHOD AND DEVICE FOR SAWING OF STONE BLOCKS

Sven Wallin, Älmhult, Sweden

Application November 21, 1955, Serial No. 548,209

Claims priority, application Sweden December 14, 1954

5 Claims. (Cl. 125—16)

The following disclosure contains a correct and full description of the invention and of the best mode known to the inventor of taking advantage of the same.

The hitherto known methods for dividing of stone blocks all use the same system and the same machines as were used during the 18th century, whether the stone blocks consist of granite, diabase, marble or limestone. The only difference is that the machines are now bigger and heavier. The materials used for sawing have of course been improved by the use of alloys with better properties. For sawing there are usually used saw blades or flat irons of a suitable alloy, preferably with a carbon content of 0.25–0.50%. The flat irons vary of course in respect to the size of the machine, but they are usually made with a length of 2–5 meters. Also the height and the thickness vary within great limits, the height between 100 and 200 millimeters and the thickness between 3 and 12 millimeters. That there are so many different thicknesses depends on the variation in the weight with which the saw blades or flat irons are loaded during sawing. This weight consists, as is well known, usually of the frame in which the saw blades are mounted. This frame is usually dimensioned for the use of as many saw blades as possible and in order to bring about enough pressure on the saw blades. The sawing takes place in such a manner that the frame swings forward and backward so that the blades in the frame slide on the stone and every blade grinds a slit in the stone. The grinding is effected by the use of a grinding material, consisting of sand or steel sand, which together with the blades grinds the slit in the stone. In order to make it possible for the sand to fall down between the blade and the stone, the saw is so constructed that the frame and the blades periodically are raised and lowered. The frame is mounted in four rods, the upper parts of which are mounted in screws, ruled by guides, which screws screw down the blades as these are sawing down in the stone. Because the frame is mounted in rods it will swing in a manner that permits the saw blades to grind in the stone only in the position that corresponds to the tangent of the swinging motion. With the small grinding length obtained with this method the grinding depth in, for example, granite will be only about 30 millimeters per hour. Experiments have been made with the rods replaced by wires. With this construction the speed of sawing is doubled. The same results have been obtained with marble and limestone. In spite of the faster sawing and feeding with the wire, all modern machines use fixed rods. This is due to the fact that the construction with wires is not sufficiently reliable. Fig. 2 shows why the fixed rods give smaller results than the wire. The fixed rod makes the trail length smaller or shorter than the elastic wire.

The object of this invention is to utilize the advantages connected with the use of wires, i. e. the longer grinding or trail length. The advantages obtained when the grinding and feeding are effected by fixed rods are also utilized. It is desirable to level the weight of the frame and thereby level the pressure during sawing. It is also desirable to obtain maximum grinding length and still obtain enough grinding material under the saw blades. An advantage of this invention is also the fact that consideration can be taken to the localization of the blades in the frame.

These and other features of this invention will be readily understood from the following description, when taken in conjunction with the accompanying drawings, which by way of example illustrate one specific embodiment of the invention.

Fig. 1 shows a principal construction of the machine;
Fig. 2 shows the manner of operation of the machine;
Fig. 3 shows principally how the machine works, and
Fig. 4 shows a detail of the machine.

According to the example shown on the drawings, the levelling of the weight of the frame 3 is arranged in the four suspending points, as schematically shown in Fig. 3. In the frame 3 the saw blades 2 are mounted in the usual manner. The frame is brought to swing forward and backward by means of a crank 6, which is connected to a cam disk 7. The frame is suspended at four points through the links N and M, Figs. 3 and 4. The frame then rests on the four rods L and works without any load as a normal sawing machine. When the blade 2 contacts the stone 1 in the point F, Fig. 2, we adjust the weight of the frame so high that the blades are folded by the pressure. By loading the rods L, Fig. 4, by means of the compressed air boxes 9 with, for example, 250 kilograms each, the pressure of the frame will decrease with $4 \times 250 = 1000$ kilograms, and the frame will keep its height position and will slide along the straight line F—G, Fig. 2. After that the frame is raised the length G—H, and new grinding material for the return trip is collected. If we assume the length of the rods $a$ to be 1000 millimeters, the total stroke $e$ of the frame to be 400 millimeters and the sliding length of the saw blades $d$ to be 250 millimeters, we obtain $b = 12.7$ millimeters and $c = 7.5$ millimeters. A raising of 7.5 millimeters therefore corresponds to a grinding length of 250 millimeters. F and G are the points in which the saw blades start or finish the sawing or grinding, Fig. 3, and H is the turning point of the frame. $b$ is the height the frame is raised when grinding material runs down under the saw blades. The compressed air boxes are constructed as valves, which in this example are actuated by compressed air, they can however be actuated by oil pressure as well, they work in both cases hydraulically. The pressure boxes 9 are suitably fixed to the frame and contain a membrane 10, made for example of rubber. The membrane is fixed to one of the ends of a guide 12 and the other end of the guide is pivotally fixed to the rod L. On both sides of the membrane the pressure boxes are provided with connections, which in a usual manner are connected to the pressure source. The rods 4 are as already mentioned pivotally fixed to the guide ruled screws 5, Fig. 1. The lower ends of the rods are by means of a link N pivotally fixed to the rod L, and the other end of the rod is by means of a link M pivotally connected to the frame 3. As the rods L are arranged under the corners of the frame, the rods will contact the underside of the frame during the swinging motion G—H. It is also possible that the frame may be too light for a certain work, in such case the pressure against the stone from the frame can be increased by feeding compressed air on the underside of the membrane 10. When the frame has to be made lighter, the compressed air is fed so that the pressure actuates the membrane in upward direction. By giving the four pressure boxes different pressures, it is possible to vary the weight of the frame in respect to the localization of the blades and the stone. For cooling of the saw blades a cooling medium is delivered, usually water, through the channel 8, which is placed over the frame and the stone. The grinding material is mixed with the water and runs with the water down under the saw blades, as has been earlier explained in this description. Instead of the mentioned hydraulic means it is of course also possible to use springs or weights in order to level the weight of the frame as much as possible. It is also possible to arrange the levelling of the weight at some other place, for example in the arms or in the screws 5.

It will readily be understood that the invention is not limited to the single embodiment thereof described and illustrated in the drawings by way of example, and that a plurality of modifications may be applied without departing from the scope of the invention.

The embodiments of the invention in which an exclusive property or privilege is claimed are defined as follows:

What is claimed is:

1. A device for cutting stone blocks comprising, in combination, a first frame supporting a plurality of parallel longitudinally-extending saw blades adapted to engage the block to be cut, means defining a supporting frame and means connecting said first frame to said supporting frame to permit longitudinal reciprocation of said first frame to draw said blades back and forth across the block, said last-named means including four first arms pivotally mounted in relation to said supporting frame, four second arms pivotally connected to said first frame and to said first arms, and fluid-pressure responsive means acting upon said second arms in response to variations in fluid pressure applied thereto.

2. A device for cutting stone blocks comprising, in combination, a first frame supporting a plurality of parallel longitudinally-extending saw blades adapted to engage the block to be cut, means defining a supporting frame and means connecting said first frame to said supporting frame to permit longitudinal reciprocation of said first frame to draw said blades back and forth across the block, said last-named means including four first arms pivotally mounted in relation to said supporting frame, four second arms pivotally connected to said first frame and to said first arms, and fluid-pressure responsive means acting upon said second arms in response to variations in fluid pressure applied thereto, said fluid-pressure responsive means comprising a plurality of fluid-pressure chambers rigidly connected to said first frame, a piston pivitally-connected to a second arm and slidable in each of said fluid-pressure chambers, said pistons being connected to a surface adapted to be acted upon by fluid pressure to urge said piston downwardly.

3. A device for cutting stone blocks comprising, in combination, a first frame supporting a plurality of parallel longitudinally-extending saw blades adapted to engage the block to be cut, means defining a supporting frame and means connecting said first frame to said supporting frame to permit longitudinal reciprocation of said first frame to draw said blades back and forth across the block, said last-named means including four first arms pivotally mounted in relation to said supporting frame, four second arms pivotally connected to said first frame and to said first arms, and fluid-pressure responsive means acting upon said second arms in response to variations in fluid pressure applied thereto, said fluid-pressure responsive means comprising a plurality of fluid-pressure chambers rigidly connected to said first frame, a piston pivotally-connected to a second arm and slidable in each of said fluid-pressure chambers, said pistons being connected to a surface adapted to be acted upon by fluid pressure to urge said piston downwardly, said surface being defined by a flexible diaphragm connected to said piston and each of said chambers being provided with a fluid inlet above said diaphragm an below said diaphragm.

4. A device for cutting stone blocks comprising, in combination, a first rectangular frame supporting a plurality of parallel longitudinally-extending saw blades positioned to engage the block to be cut, said first frame having extensions at each of its corners, a plurality of uprights defining a supporting frame and means for connecting said first frame to said supporting frame to permit longitudinal reciprocation of said first frame to draw said blades back and forth across the block, said last-named means including four first arms pivotally mounted in relation to said uprights, four second arms pivotally connected to said extensions of said first frame and to said first arms, and fluid-pressure responsive means acting upon said second arms in response to variations in fluid pressure applied thereto, said fluid-pressure responsive means comprising four fluid-pressure chambers each rigidly connected to a first frame extension above a second arm, a piston pivotally connected to a second arm approximately at its center and slidable in the associated fluid-pressure chamber, a flexible diaphragm in each chamber connected to the end of the piston therein, and each chamber having a fluid inlet for admission of fluid above said diaphragm and a second fluid inlet for admission of fluid below said diaphragm.

5. A method of cutting a stone block which comprises applying at least one saw edge to a surface of said block, transversely reciprocating said saw edge along predetermined lines with said saw edge in contact with said block and simultaneously maintaining a variable predetermined pressure upon said saw edge by applying varying regulated predetermined fluid-actuated forces at four laterally and longitudinally spaced-apart points removed from said saw edge but acting simultaneously thereupon, said forces acting downwardly in the direction of said surface.

References Cited in the file of this patent

UNITED STATES PATENTS

| | | |
|---|---|---|
| 749,707 | Thompson | Jan. 12, 1904 |
| 759,422 | Davis | May 10, 1904 |